UNITED STATES PATENT OFFICE.

PHILIP C. HOFFMANN, OF BALTIMORE, MARYLAND, ASSIGNOR TO THE AMERICAN PHOSPHATE AND CHEMICAL COMPANY, OF SAME PLACE.

PROCESS OF TREATING PHOSPHATES.

SPECIFICATION forming part of Letters Patent No. 496,687, dated May 2, 1893.

Application filed March 15, 1892. Serial No. 424,951. (No specimens.)

*To all whom it may concern:*

Be it known that I, PHILIP C. HOFFMANN, a citizen of the United States, residing at Baltimore, in the State of Maryland, have invented certain new and useful Improvements in the Treatment of Mineral Phosphates; and I do hereby declare the following to be a full, clear, and exact description of the invention, such as will enable others skilled in the art to which it appertains to make and use the same.

My invention relates to certain new and useful improvements in the treatment of mineral phosphates, and particularly to that class of phosphates known as the inland Florida phosphate deposits, for the production of acid phosphate.

The art, as at present understood and worked, involves the treatment of those phosphates known as South Carolina river and inland phosphates, Florida river phosphates and such other phosphates as yield satisfactorily to the treatment which has been found best suited to these last named South Carolina river and inland and Florida river phosphates. But it has been found, by experience, as will hereinafter more fully appear, that those phosphates represented by the class known commercially as Florida land phosphates (including inland pebble and rock phosphate) will not yield satisfactorily to any treatment which has been found applicable and satisfactory with respect to either the South Carolina river deposits, South Carolina land deposits or the Florida river deposits. Indeed, it has been found to be impossible to produce commercial acid phosphate from the Florida inland phosphates, except by admixture of other phosphates, or foreign substances, as driers, or by allowing the acid phosphate to lie several months after production, subject to the slow process of drying by natural and unaided evaporation, the result, even then, being uncertain and frequently of no commercial value, and the process being too slow and expensive to permit of being worked profitably.

In the treatment of the South Carolina river and inland phosphates, the Florida river phosphates, and those phosphates which yield satisfactorily to the treatment heretofore applied to the last named classes of phosphates, the method, as now generally practiced, is, to reduce the phosphatic material, by any known means, to a powder, late discoveries proving that the finer the powder, the more satisfactory the result, and the best results following where the material is crushed, ground or divided, so as to readily pass through a so-called eighty mesh or finer screen. After the rock has been powdered, as above described, it is placed in a suitable mixer, and sulphuric acid is then applied, in a manner and according to certain theoretical chemical requirements, which are well known to all manufacturers of acid phosphate. The acid and powdered phosphate are thoroughly mixed and, as a result, a strong re-action takes place creating a heat of about 100° Celsius. At this point various gases, such as carbonic acid, hydrofluoric acid, &c., are driven out, and, at the same time, free phosphoric acid and sulphate of lime are formed, leaving part of the tri-calcic phosphate undecomposed. After a few minutes, this boiling substance begins to settle and becomes more or less firm, and the manipulator, who has charge of the mixing, when this point is nearly reached, removes the charge to the "dump" or pile, and successive charges, so treated and dumped, enlarge or increase the pile. In the mass, thus piled up, a second re-action takes place, viz: the free phosphoric acid acts on the remaining undecomposed tri-calcic phosphate and converts the same into mono-calcic phosphate (or water soluble) and bi-calcic (citrate of ammonia soluble) phosphate. During the progress of this re-action, the degree of heat gradually declines or becomes lowered and the acid phosphate accordingly becomes solid and dry enough to be considered in mechanical condition, that is to say, containing from ten to fourteen per cent. of moisture and from one half per cent. to one and one half per cent. of insoluble tri-calcic phosphate. But it has been found by experience that this mode of treatment, when applied to the Florida inland phosphates will not produce successful, or commercially valuable results, for the reason that, when the theoretical amount of sulphuric acid is applied to the ground mass in the mixer, the re-action which takes place is barely noticeable, and the degree of heat developed is only about 50° Celsius, and that the resulting mixture of the rock and acid does not as in the case of the South Carolina and other phosphates, thicken and become more or less firm, when left in the mixer as above described; and it has also been found that, when the mixed material is dumped, it runs or flows, being of about the consistency of molasses, and only begins to partly solidify after a period of four or five days. I have also observed, in my personal experience and experimentation with these inland Florida phosphates, that during the first re-action, a large number of lumps are formed, which is due to the fact that, after free phosphoric acid and sulphate of lime have been formed, the sulphate of lime at once creates a crust around the undecomposed tri-calcic phosphate. At this point of the process, I have also observed features which differ from any results connected with the action of sulphuric acid on other phosphates. In the case of Charleston and other similar rocks, the substance solidifies uniformly under the development of an original heat of about 100° Celsius, which heat gradually declining, the product assumes a merchantable condition at about the end of a week's time; while in the case of the Florida inland phosphates, the mass is, as above stated, in a semi-fluid state, acting under the influence of an original heat of only about 50° Celsius, and the remaining tri-calcic phosphate is practically a kernel contained or held and protected by a crust or shell of sulphate of lime. I have no theory to advance, nor is it necessary that I should advance a theory, with reference to the formation of these lumps, and it is only necessary for me to state that I have found such result to be a fact, and that the object of my experiment and research has been to determine, among other things, the best method of overcoming this difficulty. I am, of course, aware of the fact that if this viscid, lumpy product be left for a long period of time, say for two or three months, in the pile, it will, ultimately, become somewhat dry, but not so dry as acid phosphates, and, besides, the decomposition is by no means so complete and there is a larger amount of insoluble phosphoric acid than in the ordinary acid phosphate. For a considerable period after the discovery of the rich, high-grade Florida inland phosphates, manufacturers and those skilled in the art of producing acid phosphate, were ignorant of the above mentioned peculiar and unsatisfactory results of the treatment of such phosphates, and while that ignorance continued, large quantities thereof were purchased by manufacturers, at high prices. But when experience had proven, as it did prove, that said phosphates could not (without admixture) be satisfactorily treated by any known method, the same were condemned, and prices thereof were greatly reduced, but without stimulating purchases. Such of said phosphates as have been sold to manufacturers have, when utilized at all, been worked up only by admixture therewith of South Carolina rock, Belgian phosphates, carbonate of lime or other driers, but such method is not only unnecessarily expensive but necessarily degrades the analysis of the finished product. I have thus referred to the character of the phosphates known to the trade, and to the processes of treatment in order that those skilled in the art to which my invention or discovery pertains, may fully understand the advantageous results flowing from the use of my invention.

In treating the Florida inland rock and pebble phosphates, I proceed as follows, to wit: After pulverizing the phosphate to a very fine, or almost impalpable powder, I mix therewith the proper theoretical amount (the proper amount being well known to those familiar with the art of making acid phosphate) of sulphuric acid, either hot or cold. A slight variation from the exact theoretical amounts of rock and acid will not substantially affect the result, but as an instance of my treatment, and as a formula for the same, I would state that I have usually employed one thousand pounds of rock, to which is added one thousand pounds of sulphuric acid of about 50° Baumé, the two being mixed in an ordinary mixer. As a result the first re-action takes place, forming free phosphoric acid, sulphate of lime and tri-calcic phosphate. Pending this re-action or after it is substantially complete, and in order to force the free phosphoric acid to prompt action upon the insoluble tricalcic phosphate (sufficient not resulting from the natural contact of the powdered rock and acid), I apply additional, independent heat to produce in the mass, a temperature not exceeding about 200° Celsius. Care must be observed not to permit the temperature to exceed the,— or about the,—last named degree of heat, for at about that temperature pyro-phosphates are formed, the presence of which is highly injurious and a preventive of satisfactory results. I have found that about twelve hours' application of this additional heat (after the first re-action has been substantially completed) will suffice to produce satisfactory results, though the time may be increased, and, in some instances, shortened, without injury, the manipulator governing the time by the apparent merchantable condition of the product.

While I have here given what I consider the simplest working rule, yet, the additional heat required may be supplied in any practical way, and may, among other ways, be supplied by heating the powdered rock before the admixture thereof with the sulphuric acid. The mixed mass may be dumped upon a pile pending the first re-action and the extra heat applied subsequently. The mixed mass may also be passed into or through a heated tunnel or inclosure for the extra heating. Hot acid may also be used, care being taken to keep up the heat until the free phosphoric acid has had time to do its work. By my process, I am enabled to produce a first class acid phosphate from these inland Florida phosphates within a much shorter period of time than is required for the production of acid phosphate, even from the easily manipulated South Carolina phosphates, by the hitherto practiced method.

What I claim as new, and desire to secure by Letters Patent, is—

The process herein described for the treatment of phosphate rock and pebble of the classes represented by the well known Florida inland phosphate rocks and pebbles, which consists in pulverizing the same, mixing therewith a theoretical amount, more or less, of sulphuric acid, supplying to the ingredients or the mass, additional heat, independent of the heat generated by the chemical re-action of the powdered mineral and sulphuric acid and maintaining the mass after mixture, continuously, or otherwise (and until the free phosphoric acid has had its effect upon the insoluble phosphoric acid as described) at a temperature above the normal temperature occasioned by the chemical reaction of the mixture (which is, ordinarily, about 50° Celsius) and yet not exceeding the temperature at which pyro-phosphates are formed, which formation takes place, ordinarily, at about a temperature of 200° Celsius.

In testimony whereof I affix my signature in presence of two witnesses.

PHILIP C. HOFFMANN.

Witnesses:
D. G. STUART,
N. CURTIS LAMMOND.